United States Patent [19]

Miller

[11] Patent Number: 4,978,055
[45] Date of Patent: Dec. 18, 1990

[54] REINFORCED POCKET STRUCTURE FOR THERMO-ADHESIVE MATERIALS

[75] Inventor: William R. Miller, West Covina, Calif.

[73] Assignee: Rembrandt Photo Services, Los Angeles, Calif.

[21] Appl. No.: 344,308

[22] Filed: Apr. 27, 1989

[51] Int. Cl.$^5$ ............... B65D 27/00; B65D 27/08
[52] U.S. Cl. .................... 229/72; 150/146; 150/147; 156/251; 156/275.1; 156/380.7; 156/380.8; 383/107; 383/903; 493/199
[58] Field of Search ............... 383/35, 903, 119, 107; 229/72; 150/146, 147; 156/251, 380.6, 380.7, 380.8, 275.1; 493/189, 199

[56] References Cited
U.S. PATENT DOCUMENTS

| | | | |
|---|---|---|---|
| 2,686,556 | 8/1954 | Gerber et al. | 156/380.7 |
| 2,788,041 | 4/1957 | Carver | 229/72 |
| 2,956,726 | 10/1960 | Pieronek et al. | 229/72 |
| 3,030,004 | 4/1962 | Pieronek et al. | 229/72 |
| 3,033,257 | 5/1962 | Weber | 156/251 |
| 3,142,437 | 7/1964 | Grant et al. | 383/903 |
| 3,172,796 | 3/1965 | Gulker | 383/119 |
| 3,435,868 | 4/1969 | Stermer | 383/37 |
| 4,770,295 | 9/1988 | Carveth et al. | 156/275.1 |

FOREIGN PATENT DOCUMENTS

| | | | |
|---|---|---|---|
| 2631711 | 1/1978 | Fed. Rep. of Germany | 229/72 |
| 1429428 | 1/1966 | France | 150/147 |
| 32670 | 3/1980 | Japan | 156/251 |

Primary Examiner—Stephen P. Garbe
Attorney, Agent, or Firm—David Weiss

[57] ABSTRACT

A reinforcing weld structure for thermo-adhesive sheets joined by high frequency welding methods. The invention is particularly concerned with a photo finisher wallet fabricated of flexible thermoplastic sheet material and including the reinforcing weld of the present invention at each corner of each of the wallet's pockets. The photo finisher wallet includes a first flexible thermoplastic sheet foldable to form front and rear covers, one of which is substantially rectangular and has a welded seam along three of its edges. A second substantially rectangular thermoplastic sheet is sealed along its three edges to the rectangular cover by the seam, the second sheet having an unsealed edge to form a pocket. A reinforcing weld according to the present invention seals the sheets at each corner of the pocket, with the seam and the reinforcing welds having been formed by an upper electrode die of a high frequency welding press having a lower electrode platen with the sheets superposed on one another and interposed between the die and the platen. The die of the present invention includes a seam producing die surface for producing the seam, and widended die surface portions inwardly extending and downwardly inclined from the seam producing die surface for respectively overlying the pocket corners at their openings for producing the improved reinforcing weld.

25 Claims, 4 Drawing Sheets

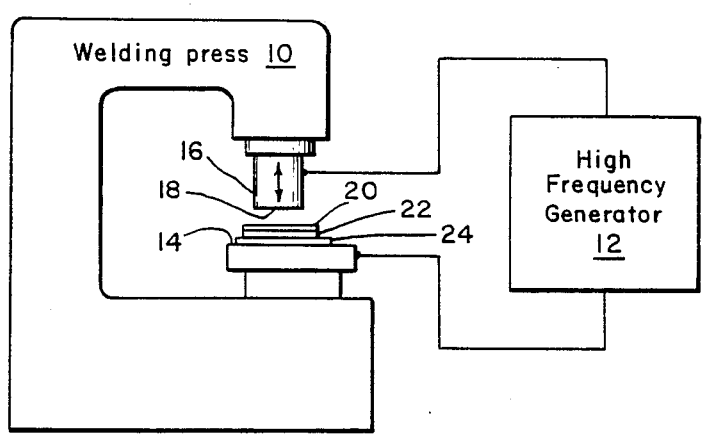
Fig. 1.
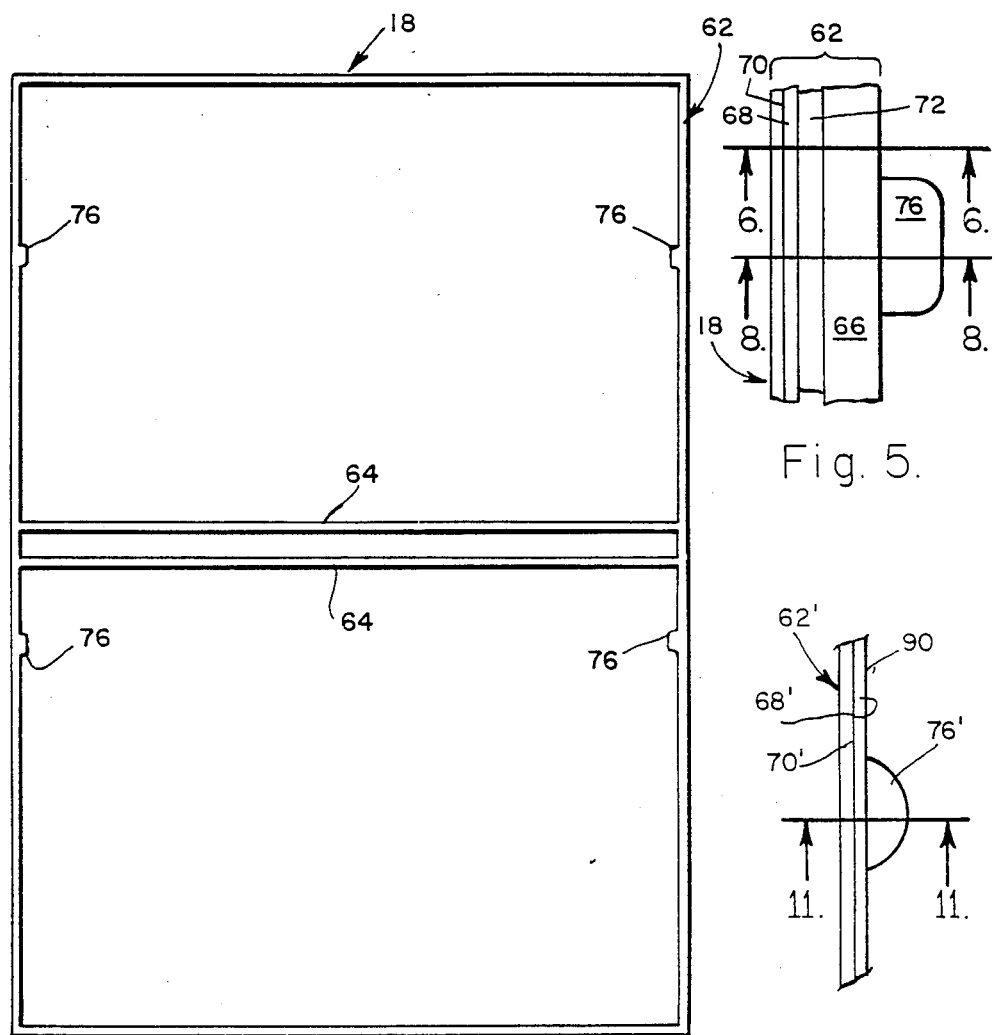
Fig. 5.
Fig. 4.
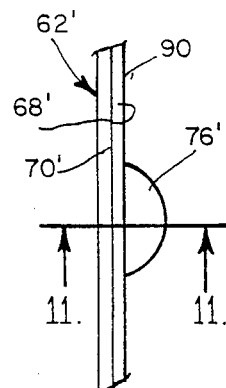
Fig. 10.

REINFORCED POCKET STRUCTURE FOR THERMO-ADHESIVE MATERIALS

BACKGROUND OF THE INVENTION

This invention relates to methods and apparatus for high frequency welding of thermo-adhesive sheets and the product produced thereby, and more particularly to electrode dies for use in a high frequency welding press for producing a reinforced pocket structure when sealing superposed thermoadhesive sheets and to the product having the reinforced pocket structure so produced.

The invention finds particular application during the fabrication of photo finisher wallets or pouches. Most non-professional photographers do not themselves process their exposed camera film or produce prints therefrom, but instead entrust these activities to a photo finishing laboratory. Typically, the customer delivers his exposed film to a photo finisher laboratory which in due course returns to the customer a package containing the finished photographic prints and the corresponding negatives. Such a package typically includes a wallet or pouch containing a stack of the finished photographic prints and another stack of the corresponding negatives usually as film strips within a protective sleeve.

One popular type of photo finisher wallet or pouch is constructed of a flexible sheet material such as polyvinyl chloride (or vinyl), which is foldable along a middle portion to form a folder having a front cover and a rear cover. Each cover is larger in each dimension than the corresponding dimensions of the photographic prints, and one of the covers includes a pocket on its inner surface into which the stack of prints may be inserted. The sleeved film strips may be inserted in the same pocket, or a separate pocket for accommodating the film strips may be on the inner surface of the other cover, or the film strip pocket may be situated upon the print pocket. In any case, each pocket is formed by a panel of flexible material affixed along three of its edges to the cover's inner surface, normally with the panel's unaffixed edge or pocket opening parallel to and directed toward the folder's middle portion.

One method of fabricating such photo finisher wallets is by utilizing flexible sheets of thermo-adhesive plastic materials, such as vinyl, polypropylene or polyethylene, in superposed relation, and to seal the edges of the superposed sheets where required to form the cover and the pockets. Specifically, a high frequency (or radio frequency) welding press is utilized, such apparatus including a horizontal lower electrode platen and a vertically movable upper electrode die, for producing an inductive field between the die and the platen with the superposed thermo-adhesive sheets interposed therebetween. The upper die includes a seam producing die surface for producing a welded seam sealing the superposed sheets when pressure is applied thereto by the upper die in the presence of the inductive field. The resulting welded seam extends along at least three edges of the cover sheet, and along three edges of the other sheet leaving an unseamed edge, sealing the sheets along the seam edges to form a pocket having an opening.

High frequency pressure welding apparatus and methods for sealing thermo-adhesive plastic sheets to one another are well known; see, for example, U.S. Pat. No. 2,638,963 issued to E.R. Frederick et al. and U.S. Pat. No. 4,043,858 issued to E. Dantowitz.

With respect to the photo finisher wallet, it can be appreciated that the junction of the unsealed pocket edge with the seam at either end of the unsealed edge (i.e. each corner of the pocket at the pocket opening) is subject to stress by forces exerted on the pocket by the contained stack of photo prints, as well as by forces exerted on the pocket incidental to each insertion and removal of the stack of prints and the stack of film strips. Such stresses may result in tearing of the pocket sheet at the pocket opening along the intersecting weld seam.

One manner of increasing the pocket's resistance to tearing under normal stresses involves producing a reinforcing weld at each corner of the pocket at the pocket opening. The reinforcing welds are formed at the same time the welded seam is produced for sealing the superposed sheets to one another, with the seams and the reinforcing welds formed by the upper electrode die having widened die surface portions inwardly extending from the seam producing die surface, the widened surface portions overlying respective corners of the pockets at their respective openings during the welding process.

SUMMARY OF THE INVENTION

The present invention provides an improved reinforcing weld having increased resistance to tearing at the corners of the openings of pockets formed by high frequency pressure welding techniques. The improved reinforcing weld is formed by providing the inwardly extending widened die surface portion with a downward inclination from the seam producing die surface.

According to the present invention, a reinforced pocket structure is provided comprising, in combination, a substantially rectangular first flexible thermo-adhesive sheet having a welded seam along at least three edges thereof; a substantially rectangular second flexible thermo-adhesive sheet sealed along three edges thereof to the first sheet by the seam and having an unsealed edge to form a pocket having an opening along the unsealed edge; a first reinforcing weld sealing the sheets at a first corner of the pocket at the pocket opening; and a second reinforcing weld sealing the sheets at a second corner of the pocket at the pocket opening; the seams and the reinforcing welds having been formed by an upper electrode die of a high frequency welding press having a lower electrode platen with the first sheet superposed on the second sheet and the superposed sheets interposed between the die and the platen; the die including a seam producing die surface for producing the seam, a first widened die surface portion inwardly extending and downwardly inclined from the seam producing die surface for overlying the first corner of the pocket at the pocket opening, and a second widened die surface portion inwardly extending and downwardly inclined from the seam producing die surface for overlying the second corner of the pocket at the pocket opening.

The photo wallet of the invention comprises, in combination, a first flexible thermo-adhesive sheet foldable to form a front cover portion and a rear cover portion, at least one of the cover portions being substantially rectangular and having a welded seam along at least three edges thereof; a substantially rectangular second flexible thermo-adhesive sheet sealed along three edges thereof to the inner surface of the substantially rectangular cover portion by the seam and having an unsealed edge to form a pocket having an opening; a first reinforcing weld sealing the sheets at a first corner of the pocket at the pocket opening; and a second reinforcing weld sealing the sheets at the second corner of the pocket at the pocket opening; the seams and the reinforcing welds having been formed by an upper electrode die of a high frequency welding press having a lower electrode platen with the first sheet superposed on the second sheet and the superposed sheets interposed between the die and the platen; the upper die including a seam producing die surface for producing the seam, a first widened die surface portion inwardly extending and downwardly inclined from the seam producing die surface for overlying the first corner of the pocket at the pocket opening, and a second widened die surface portion inwardly extending and downwardly inclined from the seam producing die surface for overlying the second corner of the pocket at the pocket opening.

The improved upper electrode die of the present invention, for use in a high frequency welding press including a lower electrode platen, includes a seam producing die surface for producing a welded seam sealing a first thermo-adhesive sheet to a second thermo-adhesive sheet, the first sheet superposed on the second sheet and the superposed sheets interposed between the platen and the die with an edge of the second sheet intersecting the seam when produced, the die having a widened die surface portion extending and downwardly inclined from the seam producing die surface for overlying the junction of said edge and said seam for producing a reinforcing weld sealing the sheets at said junction. The invention further includes the reinforcing weld so produced.

In another aspect of the upper electrode die of the present invention, for use in a high frequency welding press including a lower electrode platen, the die includes a seam producing die surface for producing a welded seam sealing two superposed thermo-adhesive sheets to form a pocket having an opening, the die further including: a first widened die surface portion inwardly extending and downwardly inclined from the seam producing die surface, for overlying the first corner of the pocket at the pocket opening when the superposed sheets are interposed between the platen and the die for producing a first reinforcing weld sealing the sheets at said first corner; and a second widened die surface portion inwardly extending and downwardly inclined from the seam producing die surface, for overlying a second corner of the pocket at the pocket opening when the superposed sheets are interposed between the platen and the die for producing a second reinforcing weld sealing the sheets at said second corner.

The improvement to the high frequency welding method utilizing a high frequency welding press including a lower electrode platen and an upper electrode die having a seam producing die surface for producing a welded seam sealing two superposed thermo-adhesive sheets to form a pocket having an opening, comprises the step of providing the die with: a first widened die surface portion inwardly extending and downwardly inclined from the seam producing die surface, for overlying a first corner of the pocket at the pocket opening when the superposed sheets are interposed between the platen and the die for producing a first reinforcing weld sealing the sheets at said first corner; and a second widened die surface portion inwardly extending and downwardly inclined from the seam producing die surface, for overlying a second corner of the pocket at the pocket opening when the superposed sheets are interposed between the platen and the die for producing a second reinforcing weld sealing the sheets at said second corner.

BRIEF DESCRIPTION OF THE DRAWINGS

The novel features which are believed to be characteristic of the invention, together with further advantages thereof, will be better understood from the following description considered in connection with the accompanying drawings in which preferred embodiments of the invention and a method for practicing the invention are illustrated by way of example. It is to be expressly understood, however, that the drawings are for the purpose of illustration and description only and are not intended as a definition of the limits of the invention.

FIG. 1 is a schematic diagram of a conventional high frequency welding press arrangement;

FIG. 4 is a plan view of the die surface of the upper electrode die utilized in fabricating the photo wallet of FIG. 2;

FIG. 5 is a plan view of a fragment of the die surface of FIG. 4 for producing the seam and reinforcing weld of FIG. 3;

FIG. 10 is a plan view of a fragment of the surface of the upper electrode die for producing the seam and reinforcing weld of FIG. 9;

DESCRIPTION OF THE PREFERRED EMBODIMENTS

Figure 2:
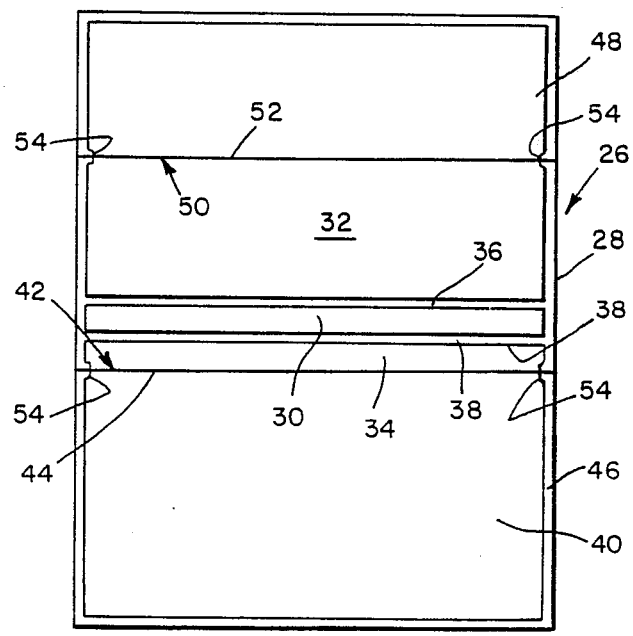
FIG. 2 is a plan view of the interior of a photo finisher wallet or pouch, shown fully open, fabricated in accordance with the method of the present invention.

Turning first to FIG. 1, there is represented conventional high frequency welding press apparatus including a welding press 10 and a high frequency generator 12. Such apparatus may be of the type manufactured by Paul Kiefel Hochfrequenc-Anlagen GmbH of West Germany, such as its model KSV600 high speed indexing automated welding unit.

The welding press 10 includes a lower electrode platen 14 and an upper electrode die 16, each electrically connected to the high frequency generator 12 which supplies high frequency energy (commonly 27.12 MHz) thereto. The upper electrode die 16 includes a downwardly facing die surface 18, and the die 16 is vertically movable to contact the upper surface of a stack of at least two thermo-adhesive plastic (or thermoplastic) sheets 20, 22 superposed upon one another and interposed between the die surface 18 and the lower platen 14. A layer or sheet of electrically insulating material 24 is situated between the lowermost thermoplastic sheet 22 and the platen 14 in conventional manner.

When the die surface 18 of the upper electrode die is brought into pressure contact with the stacked thermoplastic sheets 20, 22 in the presence of the high frequency dielectric field produced by the generator 12, the thermoplastic sheets 20, 22 are welded to one another according to a pattern provided by the die surface 18. A welded seam pattern is typically produced for joining the thermoplastic sheets, the welding occurring from the combination of the heating of the thermoplastic sheets in response to their presence in the high frequency dielectric field and the application of pressure provided by the die surface 18. As is well known, the welding occurs at a temperature where the properties of such thermoplastic materials are active; the molecular chains are understood to flow freely into one another and become united. When the thermoplastic sheets 20, 22 are removed from the dielectric field and allowed to cool, such as when the upper electrode die 16 is upwardly withdrawn, the inter-molecular attractions reappear and a solid and homogeneous connection is formed.

Turning to FIG. 2, a first preferred embodiment of a photo finisher wallet 26 of the present invention includes a substantially rectangular flexible sheet 28 of a thermoplastic material such as vinyl, foldable along a middle portion 30 to form a substantially rectangular flexible front cover portion or panel 32 and a substantially rectangular flexible rear cover portion or panel 34. The thickness of the cover sheet may be approximately 0.008 inch or 0.010 inch, although flexible sheets having other thicknesses may be employed. The middle portion 30 is a strip of the cover sheet 28 bordered by at least one and preferably two parallel fold lines or creases which may implemented by respective bar seals 36, 38 produced during the high frequency welding process. When the cover sheet 28 is folded along the bar seals 36, 38, one bar seal 36 defines the top edge of the front cover 32 while the other bar seal 38 defines the top edge of the rear cover 34. The front and rear covers 32, 34 are of substantially equal dimensions, and the cover sheet 28 may be opaque so that both front and rear covers 32 and 34 are opaque. Alternatively, the cover panels 32, 34 may comprise two separate sheets welded together by at least one of the bar seals 36, 38, so that the cover panels 32, 34 may be of different colors or one cover panel (preferably the front cover panel 34) may be opaque while the other cover panel may be transparent.

A second substantially rectangular flexible thermoplastic sheet 40, preferably of vinyl and which may be transparent, is affixed along three of its edges to the inner surface of one of the cover panels 32, 34 (such as the rear cover panel 34 as shown) to form a pocket 42 for storing a stack of photographic prints. The pocket's unaffixed edge or opening 44 is directed toward and extends parallel to the cover's fold, i.e. the fold lines of the middle portion 30 implemented by the bar seals 36, 38. During the high frequency welding process, the pocket sheet or panel 40 is affixed or sealed to the rear cover panel 34 by a welded seam 46 along the remaining three edges of the pocket panel 40 and along the three free edges of the rear cover panel 34.

The first preferred embodiment of the wallet 26 includes a third substantially rectangular flexible thermoplastic sheet 48, preferably vinyl and which may be transparent, affixed along three of its edges to the inner surface of the other cover panel (such as the front cover panel 32 as shown) to form a pocket 50 for storing developed film strips or negatives corresponding to the photographic prints for being stored in the print pocket 42. The pocket 50 formed by the third sheet 48 having its unaffixed edge or opening 52 directed toward and extending parallel to the cover's fold, i.e. the fold lines of the middle portion 30 implemented by the bar seals 36, 38. The remaining three edges of the pocket sheet or panel 48 are affixed or sealed to the front cover panel 32, during the high frequency welding process, by means of the weld seam 46 along the three free edges of the front cover panel 32 and which preferably extends in continuous manner along all four edges of the cover sheet 28. The height of the film strip pocket 50 is typically shorter than the height of the photo print pocket 42.

The thickness of the pocket sheets 40 or 48 may be approximately 0.005 inch, although flexible sheets having other thicknesses may be employed.

A reinforcing weld 54 is situated at each corner of each pocket 42, 50 at their respective openings 44, 52, the improved reinforcing weld of the present invention inwardly extending from the seam 46 and inclined from the seam 46 into the material thickness dimension. The inclination of the improved reinforcing weld preferably extends from the seam 46 formed by the die 16, from the outside surface of the cover sheet 28, and inwardly toward the pocket sheet 40 or 48, as applicable, i.e. inclined toward the viewer (as viewed in FIG. 2) from the peripheral seam 46 or into the plane of the paper (as viewed in FIG. 3) from the peripheral seam 46.

Figure 3:
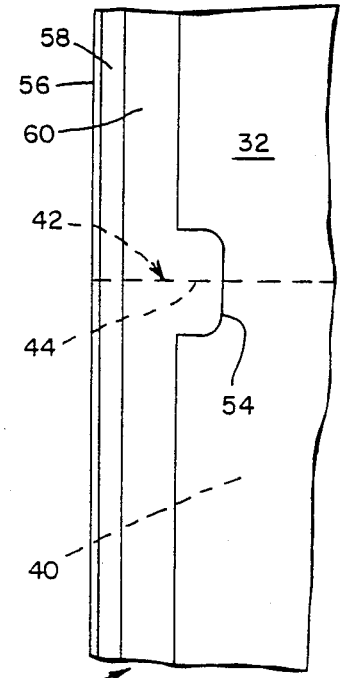
FIG. 3 is a plan view of a fragment of the exterior of the wallet of FIG. 1, indicating a preferred configuration of a welded seam and including a reinforcing weld.

A preferred configuration of the peripheral seam 46, shown in FIG. 3, includes an outer tear seal 56, a bead 58 and a bar seal 60, all of which and the method of their formation being well known in the high frequency thermoplastic welding art.

The die surface 18 of the electrode die 16, for producing the wallet 26 shown in FIG. 2, is represented generally in FIG. 4 and includes a peripheral seam producing die surface 62, and further includes two bar seal producing die surfaces 64 for producing the parallel bar seals 36, 38 implementing the wallet's fold lines. The detail of the peripheral seam producing die surface 62 for producing the preferred configuration of the seam 46 of FIG. 3 is represented in FIG. 5. The die 16 is conventionally manufactured of an electrically conductive material of suitable mechanical properties, for example brass or bronze, and the preferred seam configuration of FIG. 3 and the die surface 18 for producing the preferred seam configuration will be described with respect to FIG. 6 along with FIGS. 4 and 5. It should be understood that reference to the pocket sheet 40 in the following description for fabricating the wallet 26 of FIG. 2 is applicable as well to the pocket sheet 48, the difference being that the pocket sheet 40 is situated on the platen 14 for being acted upon by a portion of the die surface 18 for being sealed to one of the cover panels (e.g. the rear cover portion 34 of the cover sheet 28), while the other pocket sheet 48 is situated on the platen 14 for being acted upon by a different portion of the die surface 18 for being sealed to the other of the cover panels (e.g. the front cover portion 32 of the cover sheet 28).

Figure 6:
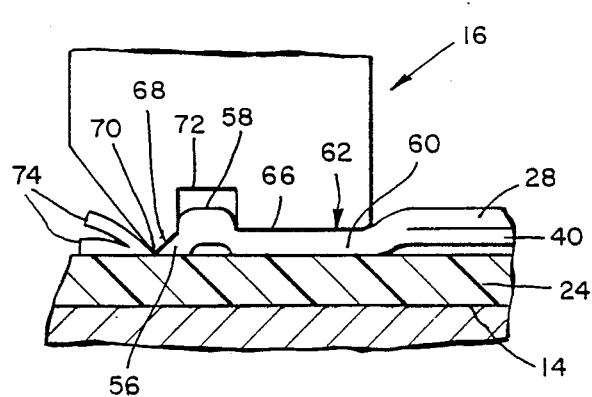
FIG. 6 is a fragmentary cross-sectional elevation view of the upper electrode die of FIG. 5, taken along the line 6—6 in the direction of the appended arrows, and the lower electrode platen producing the seam of FIG. 3.

Referring primarily to FIG. 6, the pocket sheet 40 is placed upon the insulating sheet 24 which in turn rests upon the platen 14 of the high frequency welding press. The cover sheet 28 is placed over the pocket sheet 40 and the die surface 18 of the upper electrode die 16 is brought into pressure engagement with the upper surface of the cover sheet 26 as previously described with respect to FIG. 1. The die surface 62 for forming the seam 46 of FIG. 3 includes a first die surface portion 66 for producing the bar seal 60, a second die surface portion 68 terminating in a cutting edge 70, and a channel 72 between the first and second die surface portions 66, 68. The cutting edge 70 is caused to contact the insulating layer 24 during the die's downward stroke in order to score the welded sheets 28, 40 along the peripheral tear seal 56, permitting excess material 74 from the sheets 28, 40 (and from the sheets 28, 48, as well as from the sheet 28 alone where the sheet 28 does not overlie a pocket sheet 40 or 48) to be torn from the tear seal 56 to reveal the wallet's edges. As shown in FIG. 6, the plane of the bar seal die surface portion 66 is parallel to the plane of the platen 14, and the vertical distance between the cutting edge 70 and the bar seal die surface 66, which is typically approximately 65 to 70 percent of the combined thickness of the two unwelded sheets 28, 40, determines the thickness (i.e. the vertical height as viewed in FIG. 6) of the bar seal 60. During the welding operation when pressure is applied by the bar seal die surface 66 to the superposed sheets 28, 40 in the presence of the dielectric field, the die surface portion 66 sinks into the softened thermoplastic material by a distance typically approximately 30 to 35 percent of the material thickness whereupon further downward travel of the die surface 66 is precluded when the cutting edge 70 contacts the insulating sheet 24, the insulating sheet 24 being sufficiently hard to preclude penetration of the cutting edge 70 at the operating pressures. The width of the bar seal die surface portion 66 (and accordingly the nominal width of the bar seal 60) in this seam configuration may be approximately 1/16 inch, although other widths are possible. The die 16 does not apply pressure to the superposed sheets 28, 40 in the vicinity of the channel 72, resulting in a shoulder or bead 58, which may be approximately 1/32 inch in width.

The improved reinforcing weld 54 of the present invention, previously described with reference to FIG. 2, is produced by a widened portion 76 of the die surface 18, indicated in FIGS. 4 and 5 and shown in cross-sectional elevation in FIG. 8. Before turning to FIG. 8, however, attention is directed to FIG. 7 wherein a conventional reinforcing weld is shown being produced by a high frequency welding die of conventional die surface configuration. A widened die surface portion 78 inwardly extends from the seam producing die surface 62, specifically (in the configuration shown) the bar seal die surface portion 66, the plane of the widened die surface portion 78 being parallel to the platen 14. The reinforcing weld 80 produced by this horizontally oriented widened surface portion 78 is of substantially uniform height throughout its width.

Figure 7:
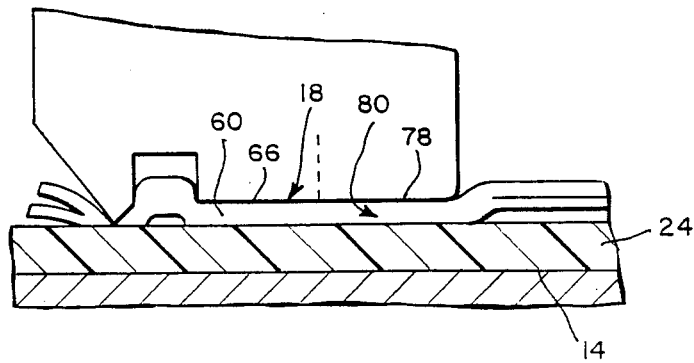
FIG. 7 is a fragmentary cross-sectional elevation view similar to FIG. 6, showing a conventional die surface portion producing a reinforcing weld.

A characteristic of the dielectric field produced by a high frequency welding press is that the high frequency lines of electric flux run not only vertically between the upper electrode die surface 18 and the lower electrode platen 14, but there are also produced stray fields on either side of the die surface 18 extending toward the platen 16. These stray fields heat the material on either side (i.e. the left and right hand sides as shown in FIGs. 6, 7 and 8) of the die 16. It should be further noted that thermoplastic sheets, during the high frequency welding process, may lift from the platen 14 (or perhaps more accurately from the insulating sheet 24) in the vicinity of the edges of the die surface, such as represented in FIGS. 6, 7 and 8 to the right of the die 16.

Figure 8:
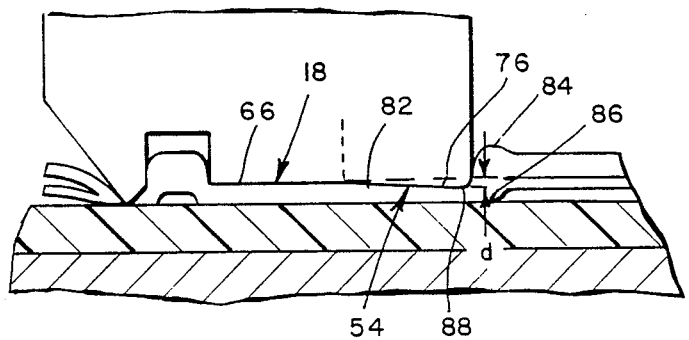
FIG. 8 is a fragmentary cross-sectional elevation view of the upper electrode die of FIG. 5, taken along the line 8—8 in the direction of the appended arrows, and the electrode platen producing the seam and the improved reinforcement weld of FIG. 3 in accordance with the present invention.

Turning to FIG. 8, the reinforcing weld die surface 76 in accordance with the present invention extends inwardly from the seam producing die surface 62 (and with respect to the preferred configuration of the seam shown in FIG. 3, from the bar seal die surface 66), and in addition is inclined downwardly toward the platen 14. As the inclined surface portion 76 extends inwardly, the distance between the die surface 76 and the insulating layer 24 on the platen 14 decreases, resulting in an increase in pressure within the softened material 82 beneath the inclined die surface 76. The increased pressure causes the softened material to extrude inwardly (i.e. to the right as viewed in FIG. 8), increasing the amount of softened material acted upon by the stray flux lines inwardly of the die 16. This extruded material results in an inward tapering of the weld material 82 beneath the inclined die surface 76 toward the termination of the weld 54 and an increase in the amount of material contained at the termination of the reinforcing weld 54 as represented by the increased thicknesses along the upper edge 84 and the lower edge 86 of the reinforcing weld 54. Since the extruded reinforcing weld 54 overlies a corner of a pocket 42 or 50 at its pocket opening 44 or 52, the additional material provided by the improved reinforcing weld 54 of the present invention increases resistance to tearing at the corners of the pocket 42 or 50 at the pocket openings 44 or 52.

The magnitude of the slope of the inclined widened die surface portion 76 is limited to a minimum which will produce the improved reinforcing weld 54 of the present invention and to a maximum which will not decrease the height or thickness of the reinforcing weld (i.e. the thickness of the material below the rounded tip 88 of the inclined die surface portion 76) to the extent that the weld 54 is weakened rather than strengthened. In one example where the width of the widened die surface portion 76 was 1/16 inch and the thicknesses of the unwelded thermoplastic sheets 28, 40 were 0.010 and 0.005 inch respectively, the depth d of the widened die surface portion 76 at its lowest point or tip 88 was 0.001125 inch. Adjusting for the roundness of the tip 88, the slope of the inclined widened die surface portion 76 in this example was approximately 3 percent. These values of depth d and slope were well within suitable design limits for producing the improved reinforcing weld 54 of the present invention.

Referring to FIGS. 5 and 3, the length of the reinforcing weld producing die surface 76 along the seam producing die surface 62 or 66, in the example discussed above, and hence the distance of the reinforcing weld 54 along the peripheral seam 46 or the peripheral bar seal 60, was approximately 3/16 inch.

Figure 9:
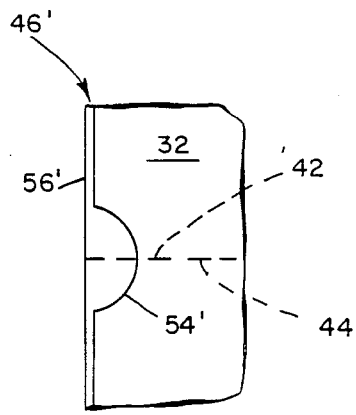
FIG. 9 is a plan view of a fragment of the exterior of a photo wallet similar to the wallet of FIG. 2, showing a second configuration of a welded seam and including a reinforcing weld.

An alternative peripheral seam configuration 46' is shown in FIG. 9, comprising a tear seal 56' similar to the tear seal 56 of the preferred peripheral seam configuration 46 illustrated in FIG. 3. The die surface 18' with portions 62', 76', represented in FIG. 10, and the corresponding alternative seam configuration 46' and reinforcing weld 54' of FIG. 9, will be described with primary reference to FIG. 11.

Figures 11, 13:
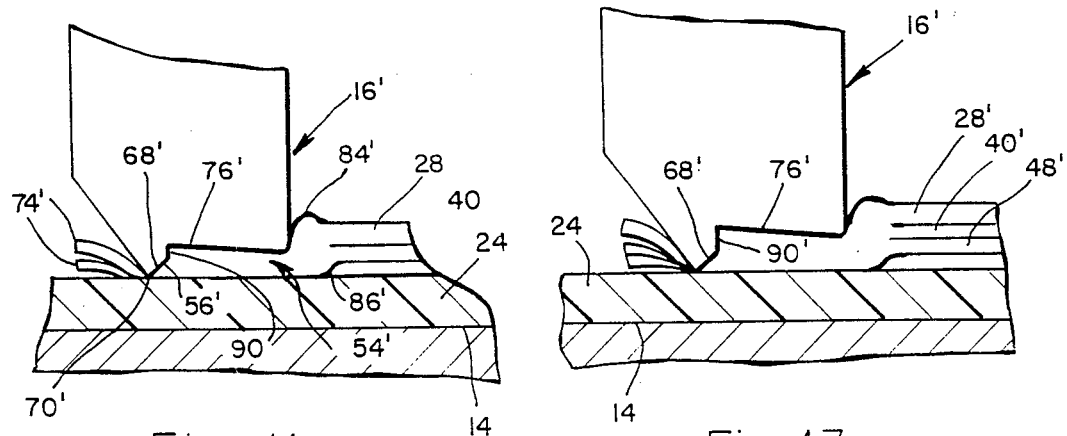
FIG. 11 is a fragmentary cross-sectional elevation view of the upper electrode die of FIG. 10, taken along the line 11—11 in the direction of the appended arrows, and the lower electrode platen producing the welded seam and improved reinforcing weld of FIG. 9 in accordance with the present invention.
FIG. 13 is a fragmentary cross-sectional elevation view similar to FIG. 11, producing the welded seam and improved reinforcing weld of FIG. 9 in accordance with the present invention, at a corner of the lower pocket shown in FIG. 12 at the pocket opening.

As shown in FIG. 11, the pocket sheet 40 is placed upon the insulating sheet 24 which in turn rests upon the platen 14 of the high frequency welding press. The cover sheet 28 is placed over the pocket sheet 40 and the die surface of the upper electrode die 16' is brought into pressure engagement with the upper surface of the cover sheet 28 as previously described with respect to FIG. 1. The die surface 62' for forming the seam 46' of FIG. 9, which may be similar to the peripheral seam 46 as represented in FIG. 2, includes a tear seal die surface portion 68' terminating in a cutting edge 70' which is caused to contact the insulating sheet 24 during the die's downward stroke for scoring the welded sheets 28, 40 along the peripheral tear seal 56'; excess sheet material 74' may be torn from the tear seal 56' to reveal the wallet's edges. The seam producing die surface may extend upwardly from the tear seal die portion 68' by a surface indicated by the vertical segment 90 (FIG. 11) for establishing the nominal thickness of the seam 46' and the reinforcing weld 54' (typically 65 to 70% of the material thickness as previously discussed).

The reinforcing weld die surface portion 76' extends inwardly from the seam producing die surface (i.e. the surface portions 58' and 90) and is inclined downwardly toward the platen 14. As the inclined surface portion 76' extends inwardly, the distance between the die surface portion 76' and the insulating sheet 24 on the platen 14 decreases, with the resulting pressure differential within the softened material causing inward extrusion thereof (i.e. to the right as viewed in FIG. 11), as previously described with reference to FIG. 8, producing the improved reinforcing weld 54' with additional material along its upper edge 84' and its lower edge 86'.

The dimensions of the reinforcing weld 54' of FIG. 9 may be the same as the dimensions of the reinforcing weld 54 of FIG. 3. The configuration of the two reinforcing welds shown (i.e. the half moon or semicircular configuration of the reinforcing weld 54' of FIG. 9 and the rounded somewhat rectangular configuration of the reinforcing weld 54 of FIG. 3) are shown as examples of possible reinforcing weld configurations, other configurations also being possible.

Figure 12:
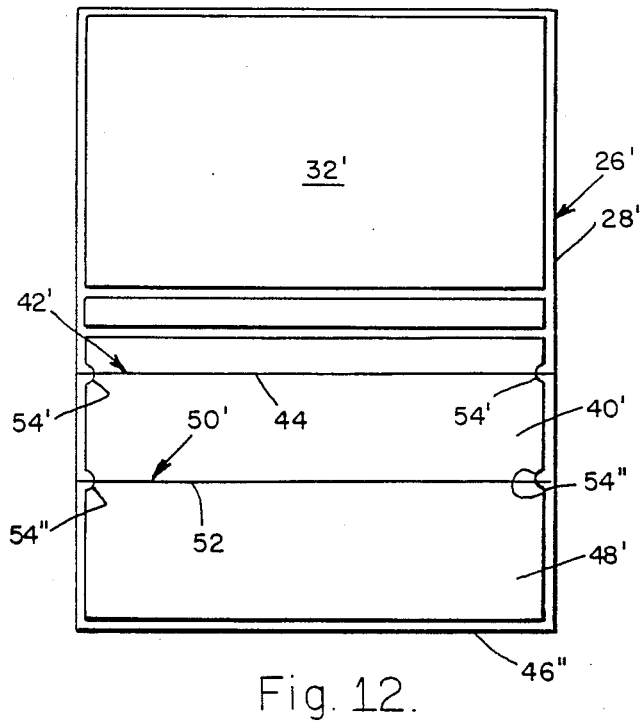
FIG. 12 is a plan view of the interior of a second preferred embodiment of a photo wallet, shown fully open.

A second preferred embodiment of a photo wallet 26' is illustrated in FIG. 12 wherein primed reference numerals refer to components similar to components indicated by corresponding unprimed referenced numerals of the first preferred wallet embodiment shown in FIG. 2. The difference between the two wallet embodiments and their manufacture (as indicated in FIG. 13) is that, in the second preferred embodiment of FIG. 12, the film strip pocket sheet 48' rests upon the platen's insulating sheet 24, the photo print pocket sheet 40' is superposed on the film strip pocket sheet 48', with the cover sheet 28' superposed on the print pocket sheet 40', so that both pocket sheets 40', 48' are affixed to the same cover panel (e.g. the rear cover panel 34' as shown). Either of the two previously described peripheral seam configurations, among others, may be employed for sealing the three superposed sheets 28', 40' 48' along three edges of each to form the two pockets 42', 50' with the print pocket 42' upon the inside of the cover panel 34' and the film strip pocket 50' upon the print pocket 42'.

For example, if a tear seal seam configuration were to be utilized, the die 16' shown in FIG. 13 may be employed, it being understood that the die 16' of FIG. 13 represents that portion of the die overlying a corner of the film strip pocket 50' at that pocket's opening 52' for forming the improved reinforcing weld 54", whereas the portion of the die 16' of FIG. 11 is situated for overlying the corner of the print pocket 42' at that pocket's opening 44' for forming the improved reinforcing weld 54' (see FIG. 12). Accordingly, the difference between the die surfaces of FIGS. 13 and 11 is that the inclined seam producing die surface portion 76' of FIG. 13 is further vertically distant from the insulating sheet 24 than the corresponding seam producing die surface 76' of FIG. 11. The increased vertical distance is indicated by the longer vertical segment 90' of FIG. 13 as compared to the vertical segment 90 of FIG. 11, and this increased vertical distance is for providing the proper thickness or height of the peripheral seam 46" and of the reinforcing weld 54" in view of the three (rather than two) sheets 28', 40' 48' being welded.

Thus, there has been described a photo finisher wallet or pouch constructed of flexible thermo-adhesive sheet material and having an improved pocket reinforcing structure. There has further been described an improved upper electrode die for utilization in a high frequency pressure welding method for producing the improved pocket reinforcing structure during fabrication of the photo wallet. Although vinyl has been discussed above as a preferred flexible thermo-adhesive material for fabricating the wallet in accordance of the present invention, other thermo-adhesive materials such as polypropylene and polyethylene may be utilized. Other embodiments and configurations of the photo finisher wallet of the present invention and of the dies, seams and reinforcing welds presented herein, may be developed without departing from the essential characteristics thereof. Accordingly, the invention should be limited only by the scope of the claims listed below.

I claim:

1. An upper electrode die of a high frequency welding press having a lower electrode platen, comprising:
    a seam producing die surface for producing a welded seam sealing two superposed thermo-adhesive sheets when interposed between said platen and said die to form a pocket having an opening:
    a first widened die surface portion inwardly extending and downwardly inclined from said seam producing die surface, for overlying a first corner of the pocket at the pocket opening when the superposed sheets are interposed between said platen and said die for producing a first weld sealing the sheets at the first corner of the pocket opening; and
    a second widened die surface portion inwardly extending and downwardly inclined from said seam producing die surface, for overlying a second corner of the pocket at the pocket opening when the superposed sheets are interposed between said platen and said die for producing a second reinforcing weld sealing the sheets at the second corner of the pocket opening.

2. In an upper electrode die of a high frequency welding press including a lower electrode platen and in combination with two superposed thermo-adhesive sheets, said die having a seam producing die surface for producing a welded seam sealing said two superposed thermo-adhesive sheets to form a pocket having an opening, the improvement comprising:
   a first widened die surface portion inwardly extending and downwardly inclined from said seam producing die surface, for overlying a first corner of said pocket at said pocket opening when said superposed sheets are interposed between said platen and said die for producing a first reinforcing weld sealing said sheets at said first corner; and
   a second widened die surface portion inwardly extending and downwardly inclined from said seam producing die surface, for overlying a second corner of said pocket at said pocket opening when said superposed sheets are interposed between said platen and said die for producing a second reinforcing weld sealing said sheets at said second corner.

3. In a high frequency welding method including the steps of providing a high frequency welding press having a lower electrode platen and an upper electrode die having a seam producing die surface, interposing two superposed thermo-adhesive sheets between said lower electrode platen and said upper electrode die, and engaging said upper die surface into pressure contact with said interposed sheets while applying a high frequency dielectric field between said electrode platen and said electrode die for producing a welded seam sealing said sheets to form a pocket having an opening, the improvement comprising the step of providing said die with:
   a first widened die surface portion inwardly extending and downwardly inclined from said seam producing die surface, for overlying a first corner of said pocket at said pocket opening when said superposed sheets are interposed between said platen and said die for producing a first reinforcing weld sealing said sheets at said first corner; and
   a second widened die surface portion inwardly extending and downwardly inclined from said seam producing die surface, for overlying a second corner of said pocket at said pocket opening when said superposed sheets are interposed between said platen and said die for producing a second reinforcing weld sealing said sheets at said second corner.

4. In a high frequency welding method for producing a welded seam sealing a first thermo-adhesive sheet to a second thermoadhesive sheet including the steps of providing a high frequency welding press having a lower electrode platen and an upper electrode die having a seam producing die surface, interposing said first sheet and said second sheet between said platen and said die with said first sheet superposed on said second sheet and with an edge of said second sheet positioned for intersecting said seam when produced, and engaging said upper die surface into pressure contact with said interposed sheets while applying a high frequency dielectric field between said platen and said die, the improvement comprising the step of providing said die with a widened die surface portion extending and downwardly inclined form said seam producing die surface for overlying the junction of said edge and said seam during the engaging step for producing a reinforcing weld sealing said sheets at said junction during the engaging step.

5. A photo finisher wallet comprising:
   a first flexible thermo-adhesive sheet foldable to form a front cover portion and a rear cover portion, one of said cover portions being substantially rectangular and having a welded seam along three edges thereof;
   a substantially rectangular second flexible thermo-adhesive sheet sealed along three edges thereof to the inner surface of said substantially rectangular one cover portion by said seam and having an unsealed edge to form a pocket having an opening;
   a first reinforcing weld sealing said sheets at a first corner of said pocket at said opening, said first weld inwardly extending from said seam and having at least a portion thereof inwardly tapered toward a thickened termination of said first weld; and
   a second reinforcing weld sealing said sheets at a second corner of said pocket at said opening, said second weld inwardly extending from said seam and having at least a portion thereof inwardly tapered toward a thickened termination of said second weld.

6. The photo finisher wallet according to claim 5, above, wherein the other of said cover portions is substantially rectangular and has a welded seam along three edges thereof, said photo finisher wallet further including:
   a substantially rectangular third flexible thermoadhesive sheet sealed along three edges thereof to the inner surface of said substantially rectangular other cover portion by said other cover portion seam and having an unsealed edge to form a second pocket having an opening;
   a third reinforcing weld sealing said first and third sheets at a first corner of said second pocket at said opening thereof, said third weld inwardly extending from said other cover portion seam and having at least a portion thereof inwardly tapered toward a thickened termination of said weld; and
   a fourth reinforcing weld sealing said first and third sheets at a second corner of said second pocket at said opening thereof, said fourth weld inwardly extending from said other cover portion seam and having at least a portion thereof inwardly tapered toward a thickened termination of said fourth weld.

7. The photo finisher wallet according to claim 6, above, wherein said seams extend along the periphery of said first sheet.

8. The photo finisher wallet according to claim 6, above, said pocket of said one cover portion being for storing a stack of photo prints and said pocket of said other cover portion being for storing film strips corresponding to said prints.

9. The photo finisher wallet according to claim 8, above, wherein said one cover portion is said rear cover portion.

10. The photo finisher wallet according to claim 8, above, wherein the height dimension of said second pocket is shorter than the height dimension of said pocket of said one cover portion.

11. The photo finisher wallet according to claim 5, above, further including:

a substantially rectangular third flexible thermoadhesive sheet sealed along three edges thereof to a surface of said second sheet by said seam and having an unsealed edge to form a second pocket having an opening;

a third reinforcing weld sealing said sheets at a first corner of said second pocket at said opening thereof, said third weld inwardly extending from said seam and having at least a portion thereof inwardly tapered toward a thickened termination of said third weld; and a fourth reinforcing weld sealing said sheets at a second corner of said second pocket at said opening thereof, said fourth weld inwardly extending from said seam and having at least a portion thereof inwardly tapered toward a thickened termination of said fourth weld.

12. The photo finisher wallet according to claim 11, above, wherein said seam extends along the periphery of said first sheet.

13. The photo finisher wallet according to claim 11, above, said second pocket being for storing film strips corresponding to photo prints for being stored in the other of said pockets.

14. The photo finisher wallet according to claim 13, above, wherein said one cover portion is said rear cover portion.

15. The photo finisher wallet according to claim 13, above, wherein the height dimension of said second pocket is shorter than the height dimension of said other pocket.

16. The photo finisher wallet according to claim 5, above, wherein said seam and said reinforcing welds having been formed by an upper electrode die of a high frequency welding press having a lower electrode platen with said first sheet superposed on said second sheet and said superposed sheets interposed between the die and the platen, and wherein the die includes a seam producing die surface for producing said seam, a first widened die surface portion inwardly extending and downwardly inclined from the seam producing die surface for overlying said first corner of said pocket at said opening, and a second widened die surface portion inwardly extending and downwardly inclined from the seam producing die surface for overlying said second corner of said pocket at said opening.

17. The photo finisher wallet according to claim 16, above, wherein the other of said cover portions is substantially rectangular and has a welded seam along three edges thereof, said photo finisher wallet further including:

a substantially rectangular third flexible thermoadhesive sheet sealed along three edges thereof to the inner surface of said substantially rectangular other cover portion by said other cover portion seam and having an unsealed edge to form a second pocket having an opening;

a third reinforcing weld sealing said first and third sheets at a first corner of said second pocket at said opening thereof, said third weld inwardly extending from said other cover portion seam and having at least a portion thereof inwardly tapered toward a thickened termination of said third weld;

a fourth reinforcing weld sealing said first and third sheets at a second corner of said second pocket at said opening thereof, said fourth weld inwardly extending from said other cover portion seam and having at least a portion thereof inwardly tapered toward a thickened termination of said fourth weld; and wherein said second cover portion seam and said third and fourth reinforcing welds having been formed by the upper electrode die of the high frequency welding press with said first sheet superposed on said third sheet and said superposed first and third sheets interposed between the die and the platen, and wherein the die includes a further seam producing die surface for producing said other cover portion seam, a third widened die surface portion inwardly extending and downwardly inclined from the further seam producing die surface for overlying said first corner of said second pocket at said opening thereof, and a fourth widened die surface portion inwardly extending and downwardly inclined from the further seam producing die surface for overlying said second corner of said second pocket at said opening thereof.

18. The photo finisher wallet according to claim 11, above, further including:

a substantially rectangular third flexible thermoadhesive sheet sealed along three edges thereof to a surface of said second sheet by said seam and having an unsealed edge to form a second pocket having an opening;

a third reinforcing weld sealing said sheets at a first corner of said second pocket at said opening thereof, said third weld inwardly extending from said seam and having at least a portion thereof inwardly tapered toward a thickened termination of said third weld;

a fourth reinforcing weld sealing said sheets at a second corner of said second pocket at said opening thereof, said fourth weld inwardly extending from said seam and having at least a portion thereof inwardly tapered toward a thickened termination of said fourth weld; and wherein said third and fourth reinforcing welds having been formed by the upper electrode die of the high frequency welding press with said first sheet superposed on said second sheet superposed on said third sheet and said superposed sheets interposed between the die and the platen, and wherein the die further includes a third widened die surface portion inwardly extending and downwardly inclined from the seam producing die surface for overlying said first corner of said second pocket at said opening thereof, and a fourth widened die surface portion inwardly extending and downwardly inclined from the seam producing die surface for overlying said second corner of said second pocket at said opening thereof.

19. A reinforced pocket structure comprising:

a substantially rectangular first flexible thermoadhesive sheet having a welded seam along three edges thereof;

a substantially rectangular second flexible thermoadhesive sheet sealed along three edges thereof to said first sheet by said seam and having an unsealed edge to form a pocket having an opening along said unsealed edge;

a first reinforcing weld sealing said sheets at a first corner of said pocket at said opening, said first weld inwardly extending from said seam and having at least a portion thereof inwardly tapered toward a thickened termination of said first weld; and a second reinforcing weld sealing said sheets at a second corner of said pocket at said opening, said second weld inwardly extending from said seam and having at least a portion thereof inwardly tapered toward a thickened termination of said second weld.

20. The reinforced pocket structure according to claim 19, above, wherein said seam and said reinforcing welds having been formed by an upper electrode die of a high frequency welding press having a lower electrode platen with said first sheet superposed on said second sheet and said superposed sheets interposed between the die and the platen, and wherein the die includes a seam producing die surface for producing said seam, a first widened die surface portion inwardly extending and downwardly inclined from the seam producing die surface for overlying said first corner of said pocket at said opening, and a second widened die surface portion inwardly extending and downwardly inclined from the seam producing die surface for overlying said second corner of said pocket at said opening.

21. A reinforced pocket structure comprising:
a substantially rectangular first flexible thermoadhesive sheet having a welded seam along three edges thereof;
a substantially rectangular second flexible thermoadhesive sheet sealed along three edges thereof to said first sheet by said seam;
a substantially rectangular third flexible thermoadhesive sheet sealed along three edges thereof to said second sheet by said seam and having an unsealed edge to form a pocket having an opening along said unsealed edge;
a first reinforcing weld sealing said sheets at a first corner of said pocket at said opening, said first weld inwardly extending from said seam and having at least a portion thereof inwardly tapered toward a thickened termination of said first weld; and
a second reinforcing weld sealing said sheets at a second corner of said pocket at said opening, said second weld inwardly extending from said seam and having at least a portion thereof inwardly tapered toward a thickened termination of said second weld.

22. The reinforced pocket structure according to claim 21, above, wherein said seams and said reinforcing welds having been formed by an upper electrode die of a high frequency welding press having a lower electrode platen with said first sheet superposed on said second sheet superposed on said third sheet and said superposed sheets interposed between the die and the platen, wherein the die includes a seam producing die surface for producing said seam, a first widened die surface portion inwardly extending and downwardly inclined from the seam producing die surface for overlying said first corner of said pocket at said opening, and a second widened die surface portion inwardly extending and downwardly inclined from the seam producing die surface for overlying said second corner of said pocket at said opening.

23. A reinforcing weld at the junction of an edge of a thermo-adhesive sheet and a welded seam sealing said sheet to another thermo-adhesive sheet superposed thereon, said weld extending along said edge from said seam and having at least a portion thereof tapered along said edge toward a thickened termination of said weld.

24. The reinforcing weld according to claim 23, above, wherein said seam and said reinforcing weld having been formed by an upper electrode die of a high frequency welding press having a lower electrode platen with said superposed sheets interposed between the die and the platen, the die including a seam producing die surface for producing said seam and a widened die surface portion extending and downwardly inclined from the seam producing die surface for overlying said junction.

25. A high frequency welding method for sealing two thermo-adhesive sheets along a welded seam to form a pocket having an opening, comprising the steps of:
providing a high frequency welding press having a lower electrode platen and an upper electrode die, said upper electrode die having a seam producing die surface for producing said welded seam, said die surface including a first widened die surface portion inwardly extending and downwardly inclined from said seam producing die surface and a second widened die surface portion inwardly extending and downwardly inclined from said seam producing die surface;
superposing said thermo-adhesive sheets and interposing said sheets between said lower electrode platen and said upper electrode die with an edge of one of said sheets positioned such that said first widened die surface portion overlies a first junction of said edge and said seam when produced and said second widened die surface portion overlies a second junction of said edge and said seam when produced; and
engaging said upper die surface portion into pressure contact with said interposed sheets while applying a high frequency dielectric field between said electrode platen and said electrode die and thereafter releasing said die to produce said seam.

* * * * *

UNITED STATES PATENT AND TRADEMARK OFFICE
CERTIFICATE OF CORRECTION

PATENT NO. : 4,978,055

DATED : December 18, 1990

INVENTOR(S) : William R. Miller

It is certified that error appears in the above-identified patent and that said Letters Patent is hereby corrected as shown below:

On the title page, in the References Cited section, add the following four U.S. patents and two other documents:

--2,638,963 5/1953 Frederick et al.
  3,513,052 5/1970 Ariyasu et al.
  3,944,454 3/1976 Burgheimer
  4,043,858 8/1977 Dantowitz
  Rembrandt Photo Services "1988 Minilab Catalog" (pages 4-7)
  Paul Kiefel GmbH Catalog (42 pages, excluding Chapter I)-- .

On the title page, the number of drawing sheets should be --3-- instead of "4".

Column 14, line 20, change "claim 11" to --claim 16--.

Signed and Sealed this

Twenty-first Day of April, 1992

Attest:

HARRY F. MANBECK, JR.

*Attesting Officer*         *Commissioner of Patents and Trademarks*